(No Model.)
T. H. MALLORY.
MILK COOLER.
No. 290,900. Patented Dec. 25, 1883.
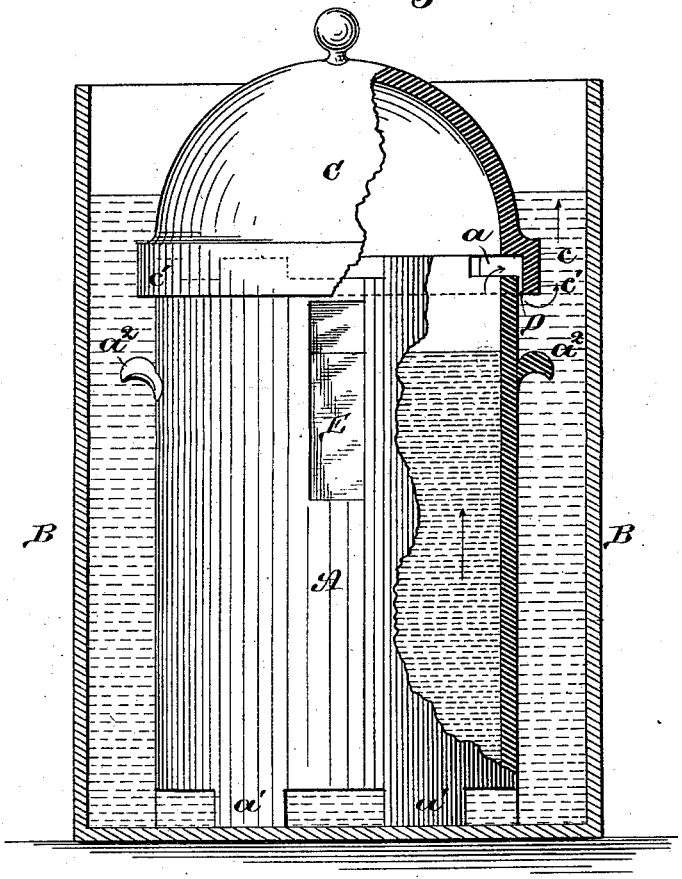
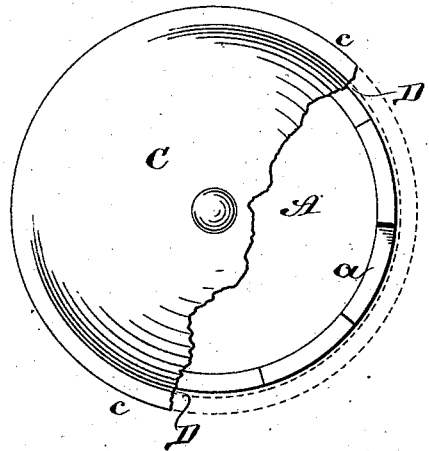
WITNESSES:
INVENTOR:
Thos. H. Mallory
per J. W. Garner
Attorney.

UNITED STATES PATENT OFFICE.

THOMAS HOWARD MALLORY, OF RED WING, MINNESOTA.

MILK-COOLER.

SPECIFICATION forming part of Letters Patent No. 290,900, dated December 25, 1883.

Application filed May 22, 1883. (No model.)

*To all whom it may concern:*

Be it known that I, THOMAS H. MALLORY, of Red Wing, county of Goodhue, and State of Minnesota, have invented a new and useful Improvement in Milk-Coolers; and I do hereby declare that the following is a full, clear, and exact description of the invention, which will enable others skilled in the art to which it appertains to make and use it, reference being had to the accompanying drawings, forming a part thereof.

My invention relates to an improvement in milk-coolers; and it consists in a jar having notches on its upper edge and legs on its bottom, and a cover having a circumferential flange on its lower edge of slightly greater interior diameter than the exterior diameter of the jar, the same to be used as and for the purpose to be more fully set forth hereinafter.

In the accompanying drawings, Figure 1 is a side elevation of my invention, partly in section. Fig. 2 is a top plan view of the same, a portion of the cover being broken away.

A represents a jar, preferably of stoneware, having on its upper edge a series of notches, $a$, and provided on its bottom with suitable legs, $a'$, for raising it a suitable distance above the bottom of the vessel B, in which the jar is placed. These legs, by raising the jar above the bottom of the vessel, allow the water contained in said vessel to circulate below the bottom of the jar, and thus present an increased surface of the jar to the cooling action of the water. The jar is provided, also, with suitable ears or handles, $a^2$, and a gage, E, set in one side, so as to indicate the quantity of the cream upon the milk.

C represents a bell-shaped cover, which is provided on its lower edge with a shoulder, $c$, from which depends a flange, $c'$, which extends around the upper edge of the jar when the cover is applied thereto, leaving a slight space between the flange and the jar, as at D.

The operation of my invention is as follows: The jar is nearly filled with milk and the cover C applied, and then set in the vessel B, which is deeper than the jar, as shown. Water is then poured into the vessel B until the jar is nearly or quite covered. The bell-shaped cover serves as a reservoir of air, which prevents ingress of water into the jar containing the milk. The heated air from the milk passes over the notches in the top of the jar, under the flange of the cover, and escapes through the water, as indicated by arrows.

I am aware that vessels that are adapted to be submerged in water for the purpose of cooling the milk contained in them have been heretofore employed, and this, broadly, I disclaim.

I am also aware that vessels having outwardly-projecting ears from their upper edges, for the purpose of leaving a space between the covers and the vessels, have also been employed, and this, also, I disclaim.

Having thus described my invention, I claim—

In a milk-cooler substantially as described and shown, the jar A, provided with the notches $a$ in its upper edge, and having the legs $a'$ on its bottom, and the cover C, having a circumferential shoulder, $c$, on its lower edge, and a flange, $c'$, depending therefrom, the flange being of slightly greater interior diameter than the exterior diameter of the jar, and adapted to project below the notches $a$ in said jar, substantially as specified.

In testimony that I claim the foregoing I append my signature.

THOMAS HOWARD MALLORY.

In presence of—
 HENRY JOHNS,
 WM. M. NEWHALL.